United States Patent [19]

Akao

[11] Patent Number: 5,234,750
[45] Date of Patent: Aug. 10, 1993

[54] PACKAGING MATERIAL FOR PHOTOSENSITIVE MATERIALS

[75] Inventor: Mutsuo Akao, Kanagawa, Japan

[73] Assignee: Fuji Photo Film Co., Ltd., Minami-Ashigara, Japan

[21] Appl. No.: 856,480

[22] Filed: Mar. 24, 1992

Related U.S. Application Data

[62] Division of Ser. No. 483,826, Feb. 23, 1990, abandoned.

[30] Foreign Application Priority Data

Apr. 20, 1989 [JP] Japan .................................. 1-101009
Apr. 20, 1989 [JP] Japan .................................. 1-101010
Feb. 23, 1990 [JP] Japan .................................. 1-41769

[51] Int. Cl.$^5$ ..................... B32B 27/36; B32B 23/08; B65D 81/30
[52] U.S. Cl. ..................... 428/219; 428/412; 428/474.4; 428/475.2; 428/512; 428/514; 428/516; 428/518; 428/483; 428/910; 428/408; 428/34.3; 264/176.1; 430/501; 426/127

[58] Field of Search .................. 524/110, 413, 431; 428/219, 412, 474.4, 475.2, 512, 483, 513, 514, 516, 518, 910

[56] References Cited

U.S. PATENT DOCUMENTS

4,211,852  7/1980  Matsuda et al. .................. 428/521
4,820,757  4/1989  Spang et al. ..................... 524/93

Primary Examiner—P. C. Sluby
Attorney, Agent, or Firm—Burns, Doane, Swecker & Mathis

[57] ABSTRACT

A resin composition containing a light-shielding material and vitamin E and packaging materials formed thereof. The light-shielding ability is increased by blending vitamin E. Laminated films where at least one thermoplastic resin film is interposed between two high Young's modulus films. The laminated films are excellent in tear strength, tensile strength, heat seal strength and bursting strength, and always secure light-shielding, moistureproofness and gas barrier. They can be used as a single-sheet bag for packaging a heavy product having shap edges.

9 Claims, 4 Drawing Sheets

PACKAGING MATERIAL FOR PHOTOSENSITIVE MATERIALS

This application is a divisional of application Ser. No. 07/483,826, filed Feb. 23, 1990, now abandoned.

BACKGROUND OF THE INVENTION

1. Field of the Invention

This invention relates to a resin composition and packaging materials for photosensitive materials such as photographic photosensitive materials.

2. Description of the Prior Art

Resin compositions for packaging materials for photographic photosensitive materials are disclosed in Japanese Patent KOKAI Nos. 63-217548 and 1-243050 and the like, resin compositions for films for photographic photosensitive materials are disclosed in Japanese Patent KOKAI No. 58-132555, and spools for a photographic film are disclosed in U.S. Pat. No. 4,796,823. In the above materials, the light-shielding ability was secured by blending a light-shielding material such as carbon black. Then, heretofore, when the light-shielding ability of the films for photographic photosensitive materials was raised, the blending amount of the light-shielding material was increased. However, the increase of the amount of the light-shielding material resulted in an increase in the occurrence of lumps and fish eyes and degradation of physical strength, moldability, heat sealing properties and the like. While, since the size and form of the spool for a photographic film are stipulated by JIS, a great quantity of a light-shielding material was blended in order to secure light-shielding ability at thin portions. As a result, the quantity of the light-shielding material at thick portions was too high.

Incidentally, as to the materials which lose their value upon exposure to light, such as photographic photosensitive materials, packaging materials capable of complete shielding from light used. The packaging materials are have various important properties such as resistance to the occurrence of pinholes, sealability, moistureproofness, gas barrier, sufficient physical strength and antistatic ability capable of preventing spark discharge as well as the above light-shielding ability.

Figure 19:
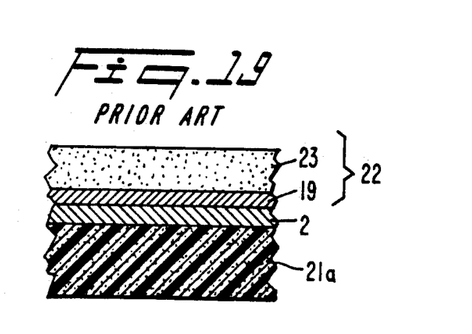
FIGS. 19 and 20 are partially sectional views indicating layer constructions of conventional packaging materials.
Figure 20:
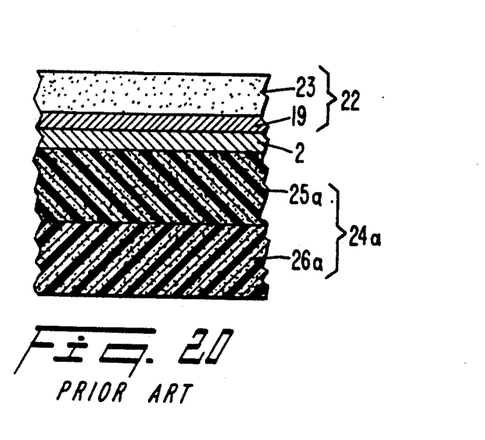

As conventional packaging materials, there were a packaging material composed of an aluminum foil on both sides of which flexible sheet(s) or LDPE resin film(s) containing carbon black were laminated, and a packaging material laminated with a light-shielding film containing more than 1 wt. % of a light-shielding material and more than 50 wt. % of L-LDPE resin. An example is shown in FIG. 19 which consisted of a polyethylene resin film 21a containing a light-shielding material and an aluminum vacuum-metallized biaxially stretched nylon resin film 22 composed of a biaxially stretched nylon resin film 23 provided with an aluminum vacuum deposited membrane 19 laminated thereto through an adhesive layer 2. However, when they were used for packaging a roll or sheets of a heavy photographic photosensitive material having sharp edges, pinholes or elongation occurred by the sharp edges. Therefore, in order to secure light-shielding, the packaging bag was made as a double-sheet bag and was accordingly expensive. Another packaging material was composed of an aluminum foil and two light-shielding L-LDPE resin films laminated on both sides of the aluminum foil (Japanese Patent KOKAI No. 60-189438). The packaging material was also used as a double-sheet bag in order to secure the qualities of the packaged materials. The inventor disclosed a packaging material having a double layer-coextruded film such as composed of a L-LDPE resin film and a polypropylene resin film as a packaging material capable of securing the qualities even as a single-sheet bag (U.S. Pat. No. 4,780,357). An example of the packaging material is shown in FIG. 20 which consisted of a light-shielding coextruded double layer film 24a consisting of a HDPE resin film 25a containing a light-shielding material and a L-LDPE resin film 26a containing a light-shielding material and an aluminum vacuum-metallized biaxially stretched nylon resin film 22 laminated thereto through an adhesive layer 2. However, in the case of the above packaging material, light-shielding and moistureproofness could not be secured by the shaking or shock during exportation or long transportation, by rough handling of freight such as by dropping or by being thrown out in courier or air cargo, by the increase of impact force by the space in a carton box or corrugated board box, or the like. That is, in the case that the packaged material was sheets, pinholes and thinning of light-shielding layers occurred by the sharp edges or corners, and in the case that the packaged material was a roll, breakage, pinholes or abrasion occurred by the sharp edges of the roll or the corners of the core.

SUMMARY OF THE INVENTION

An object of the invention is to provide a resin composition capable of fortifying light-shielding ability without increasing light-shielding materials.

Another object of the invention is to provide a packaging material for photographic photosensitive materials of which the light-shielding ability is fortified without increasing light-shielding materials.

The inventor unexpectedly found that, when vitamin E was added to a resin composition together with a light-shielding material, the light-shielding ability was improved by more than 20% compared with the composition not containing vitamin E.

Thus, the present invention provides a resin composition comprising a thermoplastic resin, a light-shielding material and vitamin E, and a packaging material for photographic photosensitive materials comprising a thermoplastic resin, a light-shielding material and vitamin E.

Another object of the invention is to provide a packaging material for photosensitive materials capable of securing light-shielding, moistureproofness and other properties resistant to a long period of transportation even in a form of a single-sheet bag.

The above objects have been achieved by a packaging material for photosensitive materials which comprises a thermoplastic resin film containing a light-shielding material, a high Young's modulus thermoplastic resin film, a low Young's modulus thermoplastic resin film containing a light-shielding material and a high Young's modulus thermoplastic resin film superposed in this order.

The above object has also been achieved by a packaging material for photosensitive materials which comprises a coextruded multilayer film comprising an intermediate high Young's modulus thermoplastic resin layer and thermoplastic resin layers containing a light-shielding material disposed on both sides thereof, and a high Young's modulus flexible sheet laminated thereto.

DETAILED DESCRIPTION OF THE INVENTION

A resin composition of the invention comprises a thermoplastic resin, a light-shielding material and vitamin E.

The thermoplastic resin is selected according to the article to be formed or the like and preferred thermoplastic resins include polyethylene resin, polypropylene resin, ethylene-copolymer resins, modified polyolefin resins, polystyrene resin, ABS resin, polyvinyl chloride resin, polyester resin, polyamide resin and polyacetal resin.

The content of the thermoplastic resin is 50 to 99.85 wt. %, preferably 70 to 99.5 wt. %.

The light-shielding material is added in order to secure light-shielding ability by absorbing or reflecting light. Examples of the light-shielding materials are described below.

Inorganic Compounds:

Oxides: silica; diatomaceous earth, alumina, titanium oxide, iron oxide, zinc oxide, magnesium oxide, antimony oxide, barium ferrite, strontium ferrite, beryllium oxide, pumice, pumice balloon, alumina fiber, etc.

Hydroxides: aluminum hydroxides, magnesium hydroxides, basic magnesium carbonate, etc.

Carbonates: calcium carbonate, magnesium carbonate, dolomite, etc.

Sulfates, sulfites: calcium sulfate, barium sulfate, ammonium sulfate, calcium sulfite, etc.

Silicates: talc, clay, mica, asbestos, glass fibers, glass balloons, glass beads, calcium silicate, montmorillonite, bentonite, etc.

Carbons: carbon black, graphite, carbon fibers, carbon hollow beads, etc.

Others: iron powder, copper powder, lead powder, tin powder, stainless steel powder, pearl pigment, aluminum powder, molybdenum sulfide, boron fibers, silicon carbide fibers, brass fibers, potassium titanate, lead titanate zirconate, titanium nitride, zinc borate, barium metaborate, calcium borate, sodium borate, aluminum paste, etc.

Organic Compounds:

wood flour such as pine, oak and sawdust, husk fibers such as almond, peanut and chaff colored various fibers such as cotton and jute, paper piece, cellophane piece, nylon fibers, polypropylene fibers, starch, aromatic polyamide fibers, etc.

Among them, preferred light-shielding materials impart opacity, and light-absorptive carbon black, titanium nitride and graphite are particularly preferred because of being excellent in heat resistance and light resistance and being relatively inactive.

Carbon blacks are divided into gas black, oil furnace black, channel black, anthracene black, acetylene black, Ketschen carbon black, thermal black, lamp black, vegetable black and animal black according to their origin. Among these, oil furnace carbon black is preferable in terms of light-shielding character, cost and improvement of properties. On the other hand, since acetylene black and Ketschen carbon black have an antistatic character, they are also preferable, though they are expensive. They may be blended to the oil furnace black in order to improve its character. A particularly preferable carbon black for the packaging material for photographic photosensitive materials is oil furnace carbon black having a pH of 6 to 9, a mean particle size of 10 to 120 m$\mu$, a volatile components content of less than 2% and an oil absorption value of more than 50 ml/100 g in view of no occurrence of fogging, rare occurrence of photosensitivity deviation, great light-shielding ability and rare occurrence of lumps of carbon black and fish eyes. As the form of the light-shielding material, there are powder coloring agent, paste coloring agent, wet coloring agent, masterbatch, dye, colored pellets, etc. Though, there are various blending methods, the masterbatch method is preferred in view of cost and the contamination of the working place. Japanese Patent KOKOKU No. 40-26196 discloses a method of making a masterbatch of polymer-carbon black by dissolving the polymer in an organic solvent and dispersing he carbon black into the solution. Japanese Patent KOKOKU No. 43-10362 discloses another method of making a masterbatch by dispersing the carbon black into polyethylene.

Vitamin E is a fat-soluble vitamin which is also known as tocopherol, and includes $\alpha$-tocopherol, $\beta$-tocopherol, $\gamma$-tocopherol and $\delta$-tocopherol. The other tocol derivatives having vitamin E activity such as 5,7-dimethyltocol, 7-methytocol and 5-methyltocol are also included. A suitable content of vitamin E is 0.005 to 1 wt. %, and 0.02 to 0.5 wt. % is preferred. When the content is less than 0.005 wt. %, the blending effect is insufficient. While, when the content is beyond 1 wt. %, a further effect obtained by the blending is small. Moreover, the excess amount affects adversely photographic photosensitive materials.

The content of the light-shielding material is 0.01 to 30 wt. %, preferably 0.05 to 15 wt. %.

To add a lubricant is preferred in order to improve film-forming ability and the like. Examples of the lubricants are:

Oleic amide lubricants; "ARMOSLIP-CP" (Lion Akzo Co., Ltd.), "NEWTRON" and "NEWTRON E-18" (Nippon Fine Chemical Co., Ltd.), "AMIDE-O" (Nitto Kagaku K.K.), "DIAMID O-200" and "DIAMID G-200" (Nippon Kasei Chemical Co., Ltd.), "ALFLOW E-10" (Nippon Oil and Fats Co., Ltd.), etc.

Erucic amide lubricants; "ALFLOW P-10" (Nippon Oil and Fats Co., Ltd.), etc.

Stearic amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.), etc.

Bis fatty amide lubricants; "BISAMIDE" (Nitto Kagaku K.K.), "DIAMID-200 BIS" (Nippon Kasei Chemical Co., Ltd.), "ARMOWAX-EBS" (Lion Akzo Co., Ltd.), etc.

Silicone lubricants; dimethylpolysiloxanes, etc. (Shinetsu Chemical Co., Ltd., Toray Silicone Co., Ltd.), etc.

Alkylamine lubricants; "ELECTROSTRIPPER TS-2" and "ELECTROSTRIPPER TS-3" (Kao Corp.), etc.

Hydrocarbon lubricants; liquid paraffin, natural paraffin, microwax, synthetic paraffin, polyethylene wax, polypropylene wax, chlorinated hydrocarbon, fluorocarbon, etc.

Fatty acid lubricants; higher fatty acids preferably more than $C_{12}$, hydroxy fatty acids, etc.

Ester lubricants; fatty acid lower alcohol esters, fatty acid polyol esters, fatty acid polyglycol esters, fatty acid fatty alcohol esters, etc.

Alcohol lubricants; polyols, polyglycols, polyglycerols, etc.

Metallic soap; metal salts such as Li, Mg, Ca, Sr, Ba, Zn, Cd, Al, Sn, Pb salts of higher fatty acids such as lauric acid, stearic acid, ricinoleic acid naphthenic acid, oleic acid, etc.

A suitable content of the lubricant is 0.005 to 5 wt. %. In the case of fatty amide lubricants, they are excellent in the improvement of slipping character, but may bleed out.

To add an antioxidant is preferred in order to prevent resin yellowing and the like. Suitable antioxidants are described below.

Phenol Antioxidants:

6-t-butyl-3-methylphenol derivatives, 2,6-di-t-butyl-p-cresol-t-butylphenol, 2,2'-methylenebis-(4-ethyl-6-t-butylphenol), 4,4'-butylidenebis(6-t-butyl-m-cresol), 4,4'-thiobis(6-t-butyl-m-cresol), 4,4-dihydroxydiphenylcyclohexane, alkyl group-induced bisphenol, styrene group-induced phenol, 2,6-di-t-butyl-4-methylphenol, n-octadecyl-3-(3',5'-di-t-butyl-4'-hydroxyphenyl)propionate, 2,2'-methylenebis(4-methyl-6-t-butylphenol), 4,4'-thiobis(3-methyl-6-t-butylphenol, 4,4'-butylidenebis(3-methyl-6-t-butylphenol), stearyl-β-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis[methylene-3-(3',5'-di-t-butyl-4'-hydroxyphenyl)propionate]methane, etc.

Ketone-Amine Condensate Antioxidants:

6-ethoxy-2,2,4-trimethyl-1,2-dihydroquinoline, polymers of 2,2,4-trimethyl-1,2-dihydroquinoline, trimethyldihydroquinoline derivatives, etc.

Arylamine Antioxidants:

Phenyl-α-naphthylamine, N-phenyl-β-naphthylamine, N-phenyl-N'-isopropyl-p-phenylenediamine, N,N'-diphenyl-p-phenylenediamine, N,N'-di-p-naphthyl-p-phenylenediamine, N-(3'-hydroxybutylidene)-1-naphtylamine, etc.

Imidazole Antioxidants:

2-mercaptobenzoimidazole, zinc salt of 2-mercaptobenzoimidazole, 2-mercaptomethylbenzoimidazole, etc.

Phosphite Antioxidants:

Alkyl-induced arylphosphite, diphenylisodecylphosphite, sodium phosphite salt of tris(nonylphenyl)phosphite, trinonylphenylphosphite, triphenylphosphite, etc.

Thiourea Antioxidants:

Thiourea derivatives, 1,3-bis(dimethylaminopropyl)-2-thiourea, etc.

Other Antioxidants:

Those useful for air oxidation, such as dilauryl thiodipropionate, etc.

Preferable antioxidants are phenol antioxidants, and particularly effective antioxidants are BHT, low volatile high molecular weight phenol antioxidants ("Irganox 1010", "Irganox 1076", trade names of Ciba-Geigy A.G., "Topanol CA", trade name of I.C.I., etc.), dilaurylthiodipropionate, distearylthiodipropionate, dialkylphosphate, etc. Two or more antioxidants may be combined. A suitable content of the antioxidant is 0.005 to 1 wt. %. When the content is less than 0.005 wt. %, the blending effect is small. While, when the content is beyond 1 wt. %, a further effect by the blending is small. Moreover, photographic film is adversely influenced by antioxidants which can cause fogging and deviation of photographic sensitivity.

An antiblocking agent may be added to the resin composition of the invention in order to prevent blocking. Suitable antiblocking agents are inorganic antiblocking agents such as silica calcium silicate, aluminum silicate, talc and calcium carbonate and organic antiblocking agents such as higher fatty acid polyvinyl esters, dicarboxylic acid ester amides, n-octadecylurea and N,N'-dioleyloxamide.

To blend a surfactant having an antiblocking effect and an antistatic effect is preferred. Such a surfactant includes cationic surfactants such as primary amine salts, tertiary amine salts, quaternary ammonium salts and pyridine derivatives, anionic surfactants such as fatty acid metal salts, alkyl sulfate ester salts, alkyl naphthalene sulfonate salts and succinate ester sulfonate salts, nonionic surfactants such as partial fatty acid esters of polyols, ethylene oxide adducts of fatty alcohols, ethylene oxide adducts of fatty acids, ethylene oxide adducts of fatty amino compounds or fatty amides, ethylene oxide adducts of alkylphenols and ethylene oxide adducts of alkylnaphthols, and ampholytic surfactants such as carboxylic acid derivatives and imidazoline derivatives.

Various additives may be added in order to improve various properties. Examples of the additives are described below.

(1) Plasticizer;

phthalic acid esters, glycol esters, fatty acid esters, phosphoric acid esters, etc.

(2) Stabilizer;

lead compounds, cadmium compounds, zinc compounds, alkaline earth metal compounds, organic tin compounds, etc.

(3) Flame retardant;

phosphoric acid esters, phosphoric acid ester halides, halides, inorganic materials, polyols containing phosphor, etc.

(4) Filler;

alumina, kaolin, clay, calcium carbonate, mica, talc, titanium dioxide, silica, etc.

(5) Reinforcing agent;

glass lobing, metallic fibers, glass fibers, glass milled fibers, carbon fibers, etc.

(6) Blowing agent;

inorganic blowing agents (ammonium carbonate, sodium hydrogen carbonate), organic blowing agents (nitroso compounds, azo compounds), etc.

(7) Vulcanizing agent;

vulcanization accelerator, acceleration assistant, etc.

(8) Deterioration preventing agent;
ultraviolet absorber, metal deactivator, peroxide decomposing agent, etc.

(9) Coupling agent;
silane compounds, titanium compounds, chromium compounds, aluminum compounds, etc.

(10) Nucleating agent;
organic nucleating agents(dibenzylidene sorbitol compounds, etc.), inorganic nucleating agents (calcium carbonate, etc.)

(11) Various thermoplastic resins, rubbers.

The above resin composition is used for various thermoplastic resin articles requiring light-shielding such as packaging materials for photographic photosensitive materials. Examples of the packaging materials for photographic photosensitive materials are:

Injection molding light-shielding containers, such as magazines, instant photographic film packs, shells for disc film, floppy discs or the like, cassettes, cartridges, container bodies for photographic film cartridge and caps therefore, hinged cases for microfilms, instant photographic films or video tape recorders and the like.

Light-shielding members of magazines for light-room loading, such as light-shielding teremp clothes, curtains, light-shielding films and light-shielding pads, for miniature laboratory magazines, for magazines for phototype setting, for instant photographic film packs or the like.

Various light-shielding films including single layer films, coextruded multilayer films and laminated films, light-shielding coating layers (extrusion coating layers, solution coating layers, etc.) light-shielding papers, support materials, light-shielding bags.

Other light-shielding tapes, light-shielding adhesives, light-shielding hot melt adhesives, light-shielding foamed sheets, light-shielding paper boxes, etc.

Among them, in the cases of photographic film spools, containers for a photographic film cartridge and various cases, they are formed of the resin composition of the invention by injection molding. Suitable thermoplastic resins for photographic film spools include polystyrene resin, synthetic rubber-blended polystyrene resin, synthetic rubber-copolymerized polystyrene resin, homopolypropylene resin, propylene-$\alpha$-olefin block copolymer resin, propylene-$\alpha$-olefin random copolymer resin, high density polyethylene resin, ethylene-$\alpha$-olefin copolymer resin, polyamide resin, acrylonitrile-styrene-butadiene copolymer resin, blends of resins containing one or more of the above resins, and various modified resins of the foregoing resins containing various modifiers or additives.

In the cases of light-shielding films, they include single layer films comprising the resin composition of the invention, coextruded multilayer films and laminated films composed of the single layer film or coextruded multilayer film and flexible sheet(s) laminated thereto directly or through an adhesive layer. Suitable thermoplastic resins for light-shielding films include ethylene-$\alpha$-olefin copolymer resins, low density polyethylene resin, medium density polyethylene resin, high density polyethylene resin, various polypropylene resins, ethylene-vinyl acetate copolymer resin, ethylene-ethyl acrylate copolymer resin, polyamide resin, polyester resin, modified polyolefin resins, ionomers and blends of resins containing one or more of the above resins. As the flexible sheets, there are thermoplastic resin films such as various polyethylene resin films, ethylene copolymer resin films, polypropylene resin films, polyvinyl chloride resin films, polyvinylidene chloride resin films, polyamide resin films, polycarbonate resin films, polyester resin films, their modified resin films and their stretched films. Other suitable flexible sheets include metallized films such as aluminum-metallized films, cellulose acetate films, cellophane films, regenerated cellulose films, polyvinyl alcohol films, papers, metal foils such as aluminum foil and nonwoven fabric. Preferable flexible sheets are various papers having an areal weight of 20 to 400 g/m$^2$ such as unbleached kraft paper, semibleached kraft paper, bleached kraft paper, twisting paper, Clupak paper, Duostress paper, white cardboard, photo base paper, pure white roll paper, coated paper, simili and glassine paper.

In the above resin composition, the light-shielding ability is increased by blending vitamin E together with a light-shielding material. As a result, the blending amount of the light-shielding material can be decreased to improve physical strength of packaging materials, to reduce the generation of lumps and fish eyes, to improve moldability and heat sealing properties and to reduce manufacturing cost. Moreover, resin degradation can be prevented by the oxidation inhibition action of vitamin E without adverse influence upon photographic properties of the packaged articles.

Representative embodiments of the packaging materials formed using the above resin composition are illustrated in FIGS. 1 through 10.

Figure 1:
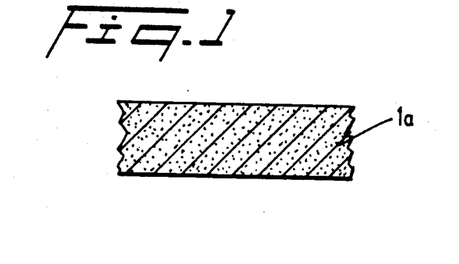
FIGS. 1 through 8 are partially sectional views of packaging materials embodying the invention containing vitamin E.

The packaging material of FIG. 1 is composed of a single layer light-shielding film 1a containing vitamin E.

Figure 2:
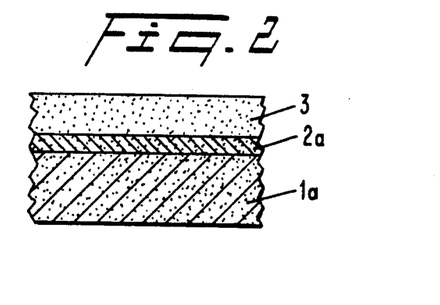

The packaging material of FIG. 2 is composed of the vitamin E-containing light-shielding film 1a of FIG. 1 and a flexible sheet 3 laminated thereto through an adhesive layer 2a containing a light-shielding material.

Figure 3:
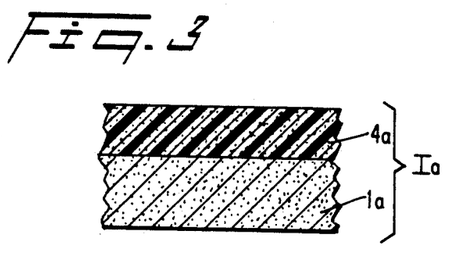

The packaging material of FIG. 3 is a coextruded double layer film Ia composed of the vitamin E-containing light-shielding film 1a and a thermoplastic resin film 4a containing a light-shielding material.

Figure 4:
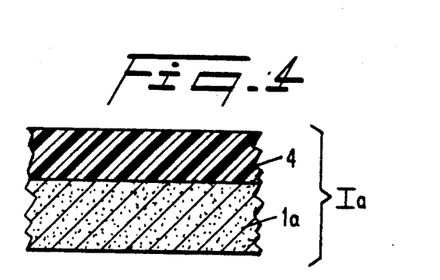

The packaging material of FIG. 4 is the same as that of FIG. 3, except that the thermoplastic resin film 4 does not contain a light-shielding material.

Figure 5:
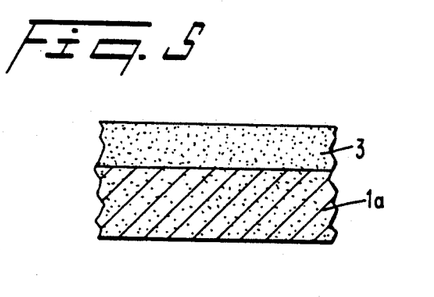

The packaging material of FIG. 5 is composed of a flexible sheet 3 and the vitamin E-containing light-shielding film 1a laminated thereto by coating.

Figure 6:
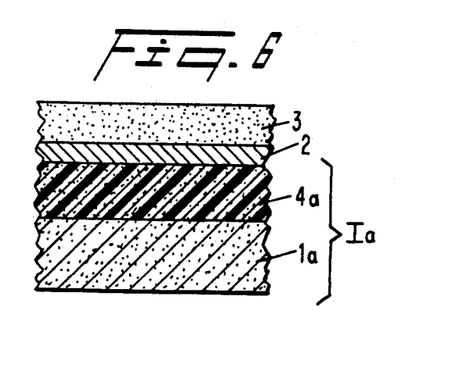

The packaging material of FIG. 6 is composed of the packaging material of FIG. 3 and a flexible sheet laminated to the side of the light-shielding thermoplastic resin film 4a through an adhesive layer 2.

Figure 7:
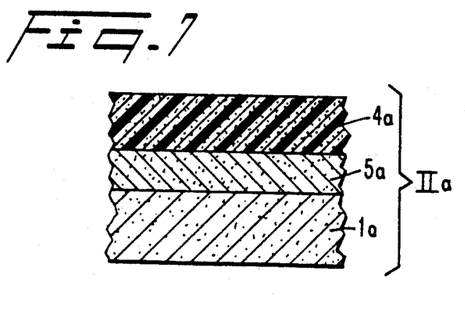

The packaging material of FIG. 7 is a coextruded triple layer film IIa composed of the vitamin E-containing light-shielding film 1a, an intermediate layer 5a containing a light-shielding material and a thermoplastic resin film 4a containing a light-shielding material disposed in this order.

Figure 8:
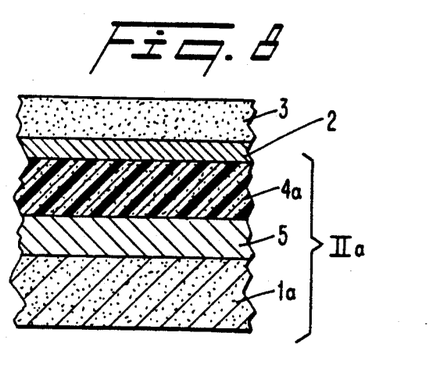

The packaging material of FIG. 8 is composed of the coextruded film of FIG. 7 wherein the intermediate layer 5 does not contain a light-shielding material and a flexible sheet 3 laminated to the side of the light-shielding thermoplastic resin film 4a through an adhesive layer 2.

Figure 9:
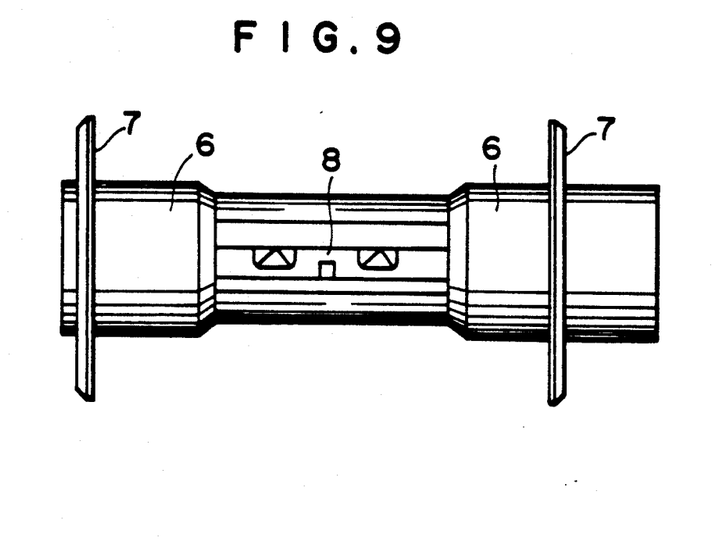
FIG. 9 is a front view of a spool for a photographic film to which the invention containing vitamin E is applicable.
Figure 10:
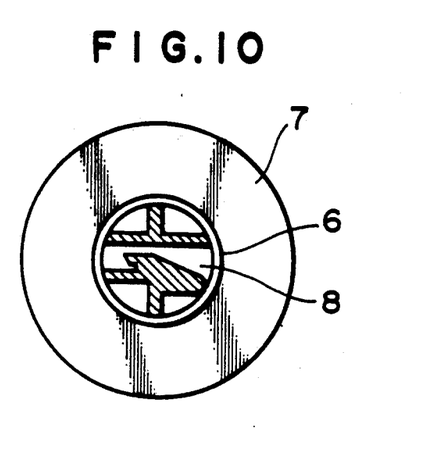
FIG. 10 is a sectional view thereof.

The packaging material of FIGS. 9 and 10 is a spool composed of a core 6, flanges 7,7 and a slot for interting the leading end of photographic film.

A packaging material for photosensitive materials comprises a thermoplastic resin film containing a light-shielding material, a high Young's modulus thermoplastic resin film, a low Young's modulus thermoplastic resin film containing a light-shielding material and a high Young's modulus thermoplastic resin film superposed in this order.

Two high Young's modulus thermoplastic resin films have a Young's modulus (ISO R1184-1970) of more than 60 kg/mm$^2$, preferably more than 80 kg/mm$^2$, further preferably more than 100 kg/mm$^2$. The resin composing two high Young's modulus thermoplastic resin films can be selected from various polyamide resins such as nylon-6, nylon-66, nylon-12, nylon-11, nylon-610 and nylon-6/66, various polyester resins, various polypropylene resins including propylene-α-olefin copolymer resins, polyethylene resins of more than 0.940 g/cm$^3$ in density containing ethylene-α-olefin copolymer resins and polystyrene resins. The film may be uniaxially or biaxially molecular oriented including stretched. Two high Young's modulus thermoplastic resin films may be identical with or different from each other. The thickness of the sum of two high Young's modulus thermoplastic resin films is 5 to 90%, preferably 10 to 80%, more preferably 20 to 70% of the total film thickness.

The low Young's modulus thermoplastic resin film has a Young's modulus of less than that of the high Young's modulus thermoplastic resin films by more than 10%, preferably more than 20%, further preferably more than 30%. When the Young's modulus of two high Young's modulus thermoplastic resin films are different, the above value is the lower one. The resin composing the low Young's modulus thermoplastic resin film can be selected form homopolyethylene resins of less than 0.940 g/cm$^3$, preferably less than 0.930 g/cm$^3$ in density, ethylene-α-olefin copolymer resins of less than 0.940 g/cm$^3$, preferably less than 0.930 g/cm$^3$ in density, ethylene-acrylate ester copolymer resins such as ethylene-ethyl acrylate copolymer resins and ethylene-methyl acrylate copolymer resins, very low density polyethylene resins, ethylene-vinyl acetate copolymer resins, ethylene-acrylic acid copolymer resins, ionomer resins and adhesive polyolefin resins containing a graft-modified polyolefin resin with unsaturated carboxylic acid of which the content is preferably more than 50%.

The thermoplastic resin film containing a light-shielding material has heat sealability, and is composed of a polyolefin resin such as low, medium and high density homopolyethylene resins, very low density polyethylene resins, ethylene-α-olefin copolymer resins, homopolypropylene resins, propylene-α-olefin copolymer resins, ethylene-vinyl acetate copolymer resins, ethylene-ethyl acrylate copolymer resins, ethylene-acrylic acid copolymer resins, ionomer resins and adhesive polyolefin resins containing graft modified polyolefin resins with unsaturated carboxylic acid. A particularly preferred thermoplastic resin film comprises more than 10 wt. % of ethylene-α-olefin copolymer resin and 1 to 10 wt. % of a light-shielding material such as carbon black or metal powder and is excellent in heat sealability, aged heat seal strength, physical strength and the like.

The light-shielding material of the thermoplastic resin film can be inorganic compounds such as oxides, hydroxides, carbonates, sulfates, sulfites, silicates, carbons and others and the organic compounds, mentioned previously. Preferred light-shielding materials, carbon blacks and blending methods are the same as mentioned previously. A suitable content of the light-shielding material is 0.01 to 30 wt. %, preferably 0.5 to 15 wt. %, more preferably 1 to 8 wt. % in view of physical strength, heat sealing properties, economical viewpoint, light-shielding ability, and the like. The kind and content of the light-shielding material are selected by considering the kind of thermoplastic resin film, thickness, the required light-shielding ability. It is not necessary that the high Young's modulus thermoplastic resin film contain a light-shielding material. In any event, the packaging material should have a light-shielding ability capable of shielding light completely.

Instead of the above packaging material, a packaging material for photosensitive materials also comprises a coextruded multilayer film comprising an intermediate high Young's modulus thermoplastic resin layer and thermoplastic resin layers containing a light-shielding material disposed on both sides thereof, and a high Young's modulus flexible sheet laminated thereto.

The Young's modulus and the kind of the resin of the intermediate high Young's modulus thermoplastic resin layer are similar to the aforementioned high Young's modulus thermoplastic resin films. The thickness of this layer is preferably 5 to 90%, particularly 10 to 50% of the total film thickness.

The thermoplastic resin layers containing a light-shielding material preferably has a Young's modulus of less than the intermediate high Young's modulus thermoplastic resin layer and the high Young's modulus flexible sheet by more than 10%, and they are similar to the aforementioned low Young's modulus thermoplastic resin film or the thermoplastic resin film containing a light-shielding material. The thickness of the thermoplastic resin layer on the high Young's modulus flexible sheet side is more than 10%, preferably more than 20%, further preferably 25 to 50%, of the total film thickness.

The high Young's modulus flexible sheet also has a Young's modulus of more than 60 kg/mm$^2$ (ISO R1184-1970), and includes uniaxially or biaxially molecularly oriented (including stretched films) of various thermoplastic resins such as various polyamide resins, various polyester resins, various polyethylene resins various polypropylene resins, various polycarbonate resins, various polystyrene resins and various polyvinyl chloride resins, unstretched films of various polyamide resins, various polyester resins, high density polyethylene resins, various polypropylene resins and the like, various papers, synthetic papers, various aluminum metallized uniaxially or biaxially molecularly oriented (including stretched), thermoplastic resin films, various metal foils, various thermoplastic resin films containing a filler, cellophane and triacetate films.

Each film, layer or sheet of the above packaging materials for photosensitive materials may contain a lubricant in order to improve film-forming ability, antiblocking ability, antistatic ability and the like. The lubricant can be selected from oleic amide lubricants, erucic amide lubricants, stearic amide lubricants, bis fatty amide lubricants, silicone lubricants, alkylamine lubricants, hydrocarbon lubricants, fatty acid lubricants, ester lubricants, alcohol lubricants and metallic soaps, mentioned previously.

Various additives may be added to the packaging materials for photosensitive materials of the invention. Examples of the additives are plasticizers, stabilizers, fire retardants, fillers, reinforcing agents, blowing agents, vulcanizing agents, deterioration preventing agents and various thermoplastic resins and rubbers, mentioned previously. Moreover, the packaging material may contain a coupling agent such as a silane compound, a titanate compound, a chromium compound or an aluminum compound, and a nucleating agent such as an organic nucleating agent e.g. a dibenzylidenesorbitol compound or an inorganic nucleating agent e.g. calcium carbonate.

The packaging material for photosensitive materials of the invention is suitable for packaging the following photosensitive materials.

Silver halide photographic photosensitive materials; X-ray films, films for printing, monochrome and color photographic printing papers, color films, master papers for printing, DTR photosensitive materials, films and papers for computerized type-setting system, microfilms, films for movie, self-developing type photographic photosensitive materials, direct positive films and papers, etc.

Diazonium photographic photosensitive materials; 4-morpholinobenzene diazonium microfilms, microfilms, copying films, form plates for printing, etc.

Azide, diazide photographic photosensitive materials containing parazidobenzoate, 4,4'-diazidostilbene, etc., such as copying films and form plates for printing etc.

Quinone diazide photographic photosensitive materials; photosensitive materials containing ortho-quinone diazide compounds or ortho-naphthoquinone diazide compounds, such as benzoquinone-(1,2)-diazido(2)-4-sulfonic acid phenyl ether, such as form plates for printing, copying films and contact printing film, etc.

Photo polymers; photosensitive materials, form plates for printing, contact printing films, containing vinyl compound monomer, etc.

Polyvinyl cinnamate esters; printing films, photoresists for IC, etc.

Moreover, the packaging material of the invention is also applicable to various photosensitive materials degraded or denatured by light, oxygen, sulfur dioxide gas or the like, such as foods including peanut with butter, margarine, snacks, relishs, cakes, teas and lavers, medicines including powder and granular medicines placed in a bag for the stomach bowels for colds, dyes, pigments, photographic developing agents, photographic fixing agents, toners and the like.

In the packaging material of the invention wherein two high Young's modulus thermoplastic resin films and a low Young's modulus thermoplastic resin film are alternately laminated, the thermoplastic resin film containing a light-shielding material improves antistatic ability, light-shielding ability, antiblocking ability and heat sealing properties. The low Young's modulus thermoplastic resin film containing a light-shielding material improves resistance to the occurrence of pinholes, adhesion of two high Young's modulus thermoplastic resin films, physical strength including tear strength, impact puncture strength and Gelbo test strength, light-shielding and antistatic property. Two high Young's modulus thermoplastic resin films protect the low Young's modulus thermoplastic resin film from the force added from the inside and outside such as shock, vibration and sticking. By the above construction, the packaging material is excellent in various physical strengths conflicting with each other such as tear strength, tensile strength, heat seal strength and bursting strength. Therefore, when sheets or a roll of heavy products are packaged, the packaging material of the invention is not elongated or broken to form a pinhole resulting in secure light-shielding and moistureproofness.

Representative embodiments of the above packaging material are illustrated in FIGS. 11 through 14.

Figure 11:
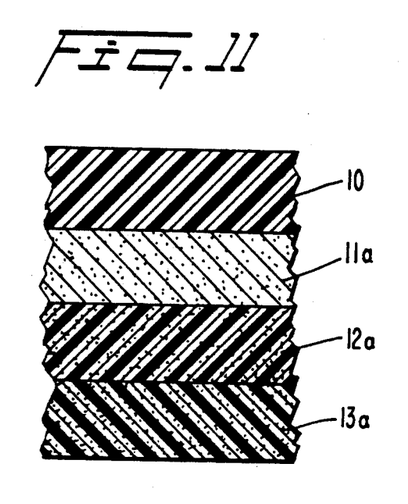
FIGS. 11 through 14 are partially sectional views of packaging materials embodying the invention wherein two high Young's modulus thermoplastic resin films and a low Young's modulus thermoplastic resin film are altenately laminated.

The packaging material of FIG. 11 is composed of a first high Young's modulus thermoplastic resin film 10, a low Young's modulus thermoplastic resin film 11a containing a light-shielding material, a second high Young's modulus thermoplastic resin film 12a containing a light-shielding material, and a thermoplastic resin film 13a containing a light-shielding material directly laminated in this order.

Figure 12:
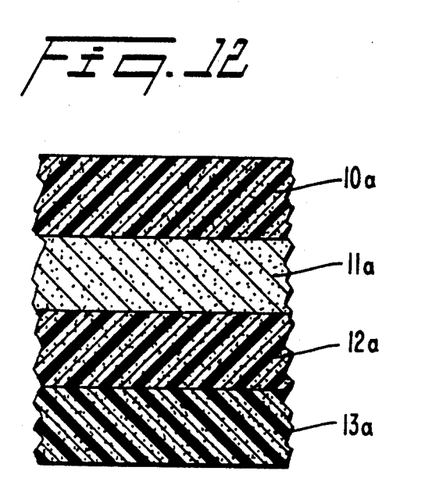

The packaging material of FIG. 12 is the same as the packaging material of FIG. 11, except that the first high Young's modulus thermoplastic resin film 10a contains a light-shielding material.

Figure 13:
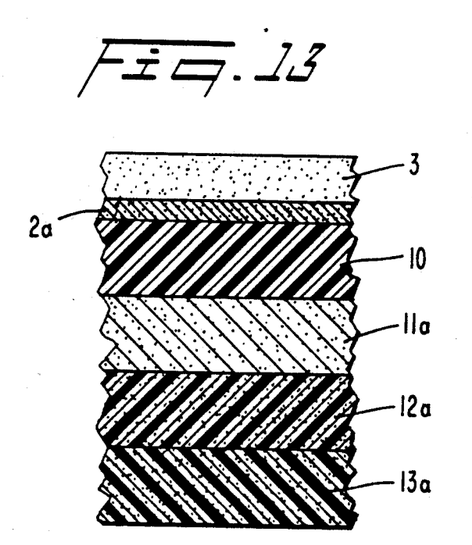

The packaging material of FIG. 13 is composed of the packaging material of FIG. 11 and a flexible sheet 3 laminated to the side of the first high Young's modulus thermoplastic resin film 10 through an adhesive layer 2a containing a light-shielding material.

Figure 14:
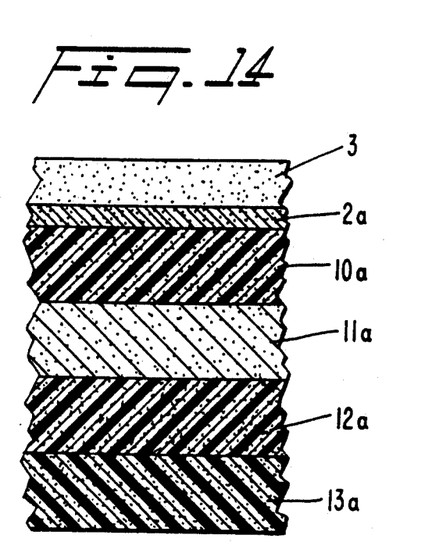

The packaging material of FIG. 14 is the same as the packaging material of FIG. 13 wherein the packaging material of FIG. 12 is used instead of the packaging material of FIG. 11.

In the packaging material of the invention wherein a coextruded multilayer film containing an intermediate high Young's modulus thermoplastic resin film is laminated to a high Young's modulus thermoplastic flexible sheet, two thermoplastic resin layers containing a light-shielding material improves antistatic ability, light-shielding ability and antiblocking ability, and the thermoplastic resin layer disposed on the heat sealed side improves heat sealing properties. The intermediate high Young's modulus thermoplastic resin film layer and the high Young's modulus flexible sheet protects the thermoplastic resin layer disposed therebetween from the force added from the inside and outside such as shock, vibration and sticking. By the above construction, the packaging material is excellent in various physical strengths conflicting with each other such as tear strength, tensile strength, heat seal strength and bursting strength. Therefore, when sheets or a roll of heavy products are packaged, the packaging material of the invention is not elongated nor broken to form a pinhole resulting in secure light-shielding and moistureproofness.

Representative embodiments of the above packaging material are illustrated in FIGS. 15 through 18.

Figure 15:
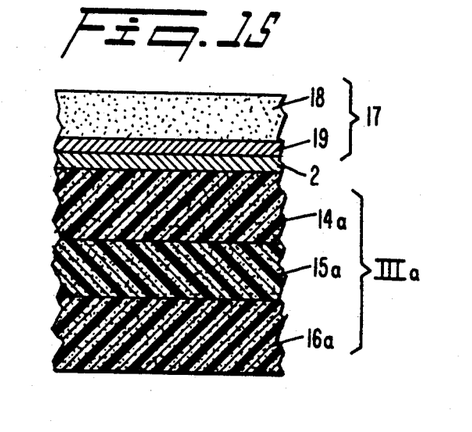
FIGS. 15 through 18 are partially sectional views of packaging materials embodying the invention wherein a coextruded multilayer film containing an intermediate high Young's modulus thermoplastic resin layer is laminated to a high Young's modulus flexible sheet.

The packaging material of FIG. 15 is composed of the coextruded multilayer film IIIa consisting of a first light-shielding thermoplastic resin layer 14a containing a light-shielding material, an intermediate high Young's modulus thermoplastic resin layer 15a containing a light-shielding material and a second light-shielding thermoplastic resin layer 16a, and a high Young's modulus flexible sheet 17 of an aluminum metallized biaxially stretched polyester resin film 18 and an aluminum membrane 19 laminated through an adhesive layer 2.

Figure 16:
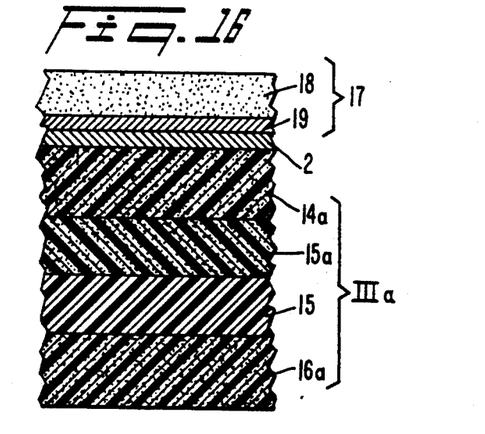

The packaging material of FIG. 16 is the same as FIG. 15, except that the coextruded multilayer film IIIa has two intermediate layers of the intermediate high Young's modulus thermoplastic resin layer 15a containing a light-shielding material and the intermediate high Young's modulus thermoplastic resin layer 15 does not contain a light-shielding material.

Figure 17:
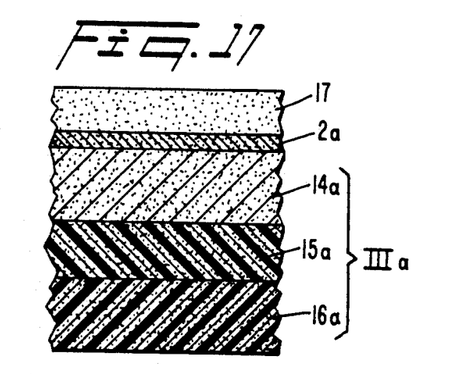

The packaging material of FIG. 17 is the same as FIG. 15, except that the high Young's modulus flexible sheet 17 is a bleached kraft paper 17 and the adhesive layer 2a contains a light-shielding material.

Figure 18:
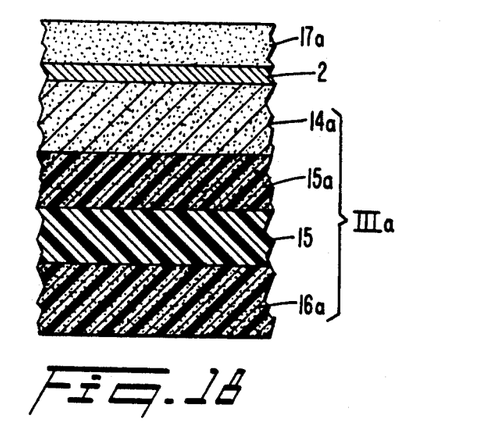

The packaging material of FIG. 18 is the same as FIG. 16, except that the high Young's modulus flexible sheet 17a is a biaxially stretched polyester resin film containing titanium dioxide.

EXAMPLES

Example I

The resin composition of Example I was composed of 92.0 wt. % of ethylene-4-methylpentene-1 copolymer resin having a MI of 2.1 g/10 minutes and a density of 0.920 g/cm$^3$, 4.5 wt. % of LDPE resin having a MI of 2.4 g/10 minutes and a density of 0.926 g/cm$^3$, 3.0 wt. % of furnace carbon black having a pH of 8.0 and a mean particle size of 21 m$\mu$, 0.2 wt. % of vitamin E, 0.1 wt. % of synthetic silica, 0.15 wt. % of calcium stearate and 0.05 wt. % of fatty amide. A packaging film 50 $\mu$m in thickness shown in FIG. 1 was molded using the above resin composition by inflation process.

Example II

The resin composition of Example II was the same as Example I, except that the content of the ethylene-4-methylpentene-1 was changed to 92.05 wt. %, the content of the vitamin E was changed to 0.05 wt. %, and 0.10 wt. % of a phenol antioxidant of tetrakis[methylene-3-(3′,5′-di-t-butyl-4′-hydroxyphenyl)propionate]methane was newly added. A packaging film 50 $\mu$m in thickness shown in FIG. 1 was molded using the above resin composition in the same manner as Example I.

Comparative Example I

The resin composition of Comparative Example I was composed of 92.5 wt. % of the same ethylene-4-methylpentene-1 copolymer resin, 4.5 wt. % of the same LDPE resin, 3.0 wt. % of the same furnace carbon black and 0.1 wt. % of the synthetic silica but did not contain vitamin E. A packaging film 50 $\mu$m in thickness shown in FIG. 1 was molded using the above resin composition in the same manner as Example I.

Example III

The resin composition of Example III was composed of 97.3 wt. % of polystyrene resin containing 1.8 wt. % of butadiene rubber, 0.25 wt. % of furnace carbon black having a pH of 8.0 and a mean particle size of 21 m$\mu$, 0.2 wt. % of vitamin E, 1.5 wt. % linear polydimethylsiloxane having a viscosity of 20,000 CS, 0.25 wt. % of calcium stearate and 0.5 wt. % of silicon dioxide. A spool for a photographic film shown in FIGS. 9 and 10 was molded using the above resin composition by injection molding.

Comparative Example II

The resin composition of Comparative Example II was the same as Example III, except that the content of the polystyrene resin was changed to 99.25 wt. %, and vitamin E, linear polydimethylsiloxane and calcium stearate were not added. A spool shown in FIGS. 9 and 10 was molded using the above resin composition in the same manner as Example III.

Various properties of the above packing films and spools were measured, and summarized in Table 1.

TABLE 1

|  | Unit |  | Invention I | Invention II | Comparative I |  | Invention III | Comparative II |
|---|---|---|---|---|---|---|---|---|
| Kind of Article | — |  | Inflation Film 50 um | | | | Spool | |
| First Thermoplastic Resin | — |  | Ethylene-4-Methylpentene-1 Copolymer Resin | | | | Polystyrene Resin 1.8 wt. % Containing Butadiene tubber | |
| MI | g/10 min. | *1 | 2.1 | 2.1 | 2.1 | *3 | 5.8 | 5.8 |
| Density | g/cm$^3$ | *2 | 0.920 | 0.920 | 0.920 | *4 | 1.04 | 1.04 |
| Content | wt. % |  | 92.0 | 92.05 | 92.5 |  | 97.3 | 99.25 |
| Second Thermoplastic Resin | — |  | LDPE Resin | | | | — | — |
| MI | g/10 min. |  | 2.4 | 2.4 | 2.4 |  | — | — |
| Density | g/cm$^3$ |  | 0.926 | 0.926 | 0.926 |  | — | — |
| Content | wt. % |  | 4.5 | 4.5 | 4.5 |  | — | — |
| Furnace Carbon Black | wt. % |  | 3.0 | 3.0 | 3.0 |  | 0.25 | 0.25 |
| Vitamin E | wt. % |  | 0.2 | 0.05 | 0 |  | 0.2 | 0 |
| Phenol Antioxidant | wt. % |  | 0 | 0.10 | 0 |  | — | — |
| Fatty Amide Lubricant | wt. % |  | 0.05 | 0.05 | 0 |  | 0 | 0 |
| Linear Polydimethyl-Siloxane | wt. % |  | 0 | 0 | 0 |  | 1.5 | 0 |
| Ca Stearate | wt. % |  | 0.15 | 0.15 | 0 |  | 0.25 | 0 |
| Synthetic Silica | wt. % |  | 0.1 | 0.1 | 0.1 |  | 0.5 | 0.5 |
| Light-Shielding Ability | — |  | A | A | B-C |  | A | B-C |
| Lumps, Fish Eyes | — |  | A | A | B-C |  | A | B |
| Blocking or Slipping | — |  | A | A | B |  | A | C |
| Frictional Electrification | — |  | A | A | B |  | — | — |
| Winding Torque | — |  | — | — | — |  | A | C |

*1 JIS K-6760
*2 JIS K-6760
*3 JIS K-6870
*4 JIS K-6871

Evaluations in Table 1 were carried out as follows:
A excellent
B having a problem improvement is necessary
C impractical Testing methods were as follows:
Light-Shielding Ability:

In the case of the packaging films, three-sided fin seal bag was prepared using each film. A color photographic printing paper was inserted therein through the opening in a dark room, and the opening was folded and completely sealed by a cellophane adhesive tape. The bag was exposed to light of 80,000 luxes for 60 minutes, and the light-shielding ability was estimated by the fogging degree of the developed color photographic printing paper.

In the case of the spools, a photographic film was wound around each spool, and placed in a photographic film cartridge with a light-shielding teremp cloth. Each cartridge was exposed to light of 80,000 luxes for 60 minutes in the state that the long boss side was positioned on the upper side, and then for 60 minutes in the state that the short boss side was positioned on the upper side. The film was developed, and the light-shielding ability was estimated by the fogging degree of the film.

Lumps, Fish Eyes:

In the case of the packaging films, the number of lumps and fish eyes of more than 0.3 mm in diameter was estimated by visual inspection in 10 cm×1 m (0.1 m²) of each film.

In the case of the spools, the number of lumps in one piece of each spool was estimated by visual inspection.

Blocking or Slipping:

In the case of the packaging films, each inflation film was wound as the tubular state, and cut in the lateral direction. The blocking was evaluated by the easiness to open the cut portion.

In the case of the spools, the resin used for molding each spool was formed in a film by injection molding, and cut into pieces having a size of 35 mm in width×75 mm in length. One piece was stuck on an inclined face, and another piece was stuck on the underside of a metal block weighing 200 g. The metal block was placed on the piece stuck on the inclined face, and the inclined angle was increased. The value was evaluated by the angle where the block began to slip. Less angle is superior.

Frictional Electrification:

An endless belt of each packaging film 35 mm in width and 1350 mm in length was prepared, and this belt was run between two SUS rollers loaded with 500 g at a speed of 12 m/min. The frictional electrification was measured by a voltmeter, and evaluated.

Winding Torque:

Measured according to the procedure disclosed in U.S. Pat. No. 4,796,823. A 35 mm photographic film cartridge containing 36 exposures film ("FUJI COLOR HR-100") was loaded in a camera, and an end of the film was drawn out of the camera through the slot provided on the opposite corner of the camera. This film was passed through nip rolls. A motor was connected to one nip roll through a torque pick up ("TDM-3S", manufactured by DENSI KOGYO K.K.). The motor was driven at a constant speed, and the film was drawn out to the end at a speed of 40 mm/sec. The winding torque value was evaluated by the torque pick up, and coverted into tension.

Example IV

The packaging material of Example IV corresponds to the embodiment of FIG. 11. The first high Young's modulus thermoplastic resin film 10 was a nylon 6 resin film 15 μm in thickness. The low Young's modulus thermoplastic resin film 11a had a thickness of 30 μm, and was composed of 60 wt. % of adhesive resin (modified polyethylene resin, "ADMER" Mitsui Petrochemical Industries), 30 wt. % of ethylene-4-methylpentene-1 copolymer resin having a MI of 2.1 g/10 minutes and a density of 0.920 g/cm³, 6 wt. % of LDPE resin having a MI of 2.4 g/10 minutes and a density of 0.923 g/cm³ and 4 wt. % of furnace carbon black. The second high Young's modulus thermoplastic resin film 12a had a thickness of 30 μm, and was composed of 92.5 wt. % of HDPE resin having a MI of 0.4 g/10 minutes and a density of 0.964 g/cm³, 4.5 wt. % of LDPE resin having a MI of 2.4 g/10 minutes and a density of 0.923 g/cm³ and 3 wt. % of furnace carbon black. The thermoplastic resin film 13a had a thickness of 25 μm, and was composed of 74.95 wt. % of ethylene-octene-1 having a MI of 4.0 g/10 minutes and a density of 0.925 g/cm³, 15 wt. % of HDPE resin having a MI of 1.1 g/10 minutes and a density of 0.954 g/cm³, 6 wt. % of LDPE resin, 4 wt. % of furnace carbon black and 0.05 wt. % of erucic amide. This packaging material was produced by coextrusion and was a coextruded quadruple layer inflation film.

Example V

The packaging material of Example V corresponds to the embodiment of FIG. 13. The flexible sheet 3 was an aluminum metallized biaxially stretched polyester resin film 12 μm in thickness provided with an aluminum membrane 400 Å in thickness disposed so that the aluminum membrane was positioned on the inside. The adhesive layer 2a 20 μm in thickness was composed of 97 wt. % of LDPE resin having a MI of 5.1 g/10 minutes and a density of 0.919 g/cm³ and 3 wt. % of carbon black, and was formed by extrusion laminating. The first high Young's modulus thermoplastic resin film 10, the low Young's modulus thermoplastic resin film 12a, the second high Young's modulus thermoplastic resin film 12a and the thermoplastic resin film 13a were the same as Example IV.

Example VI

The packaging material of Example VI corresponds to the embodiment of FIG. 12. The first high Young's modulus thermoplastic resin film 10a had a thickness of 15 μm, and was composed of 92.5 wt. % of HDPE resin having a MI of 0.4 g/10 minutes and a density of 0.964 g/cm³, 4.5 wt. % of LDPE resin having a MI of 2.4 g/10 minutes and a density of 0.923 g/cm³ and 3 wt. % of aluminum powder. The low Young's modulus thermoplastic resin film 11a, the second high Young's modulus thermoplastic resin film 12a and the thermoplastic resin film 13a were the same as Example IV.

Example VII

The packaging material of Example VII corresponds to the embodiment of FIG. 14. The flexible sheet 3 was a reinforced bleached kraft paper blended with 2 wt. % of polyacrylamide resin having an areal weight of 35 g/m². The adhesive layer 2a 20 μm in thickness was composed of 97 wt. % of LDPE resin having a MI of 5.1 g/10 minutes and a density of 0.919 g/cm³ and 3 wt. % of titanium dioxide, and formed by extrusion laminating. The first high Young's modulus thermoplastic resin film 10a, the low Young's modulus thermoplastic resin film 11a, the second high Young's modulus thermoplastic resin film 12a and the thermoplastic resin film 13a were the same as Example VI.

Conventional Example I

The packaging material of Conventional Example I corresponds to FIG. 19. The polyethylene resin film 21a containing a light-shielding material had a thickness of 70μm, and was composed of 97 wt. % of LDPE resin having a MI of 2.4 g/10 minutes and a density of 0.923 g/cm³ and 3 wt. % of furnace carbon black. The film was molded by the inflation process. The aluminum metallized biaxially stretched polyester resin film 22 and the adhesive layer 2 were the same as Example V, except that the adhesive layer did not contain carbon black.

Conventional Example II

The packaging material of Conventional Example II corresponds to FIG. 19. The polyethylene resin film 21a containing a light-shielding material had a thickness of 20μm, and was composed of 89.85 wt. % of low pressure ethylene-4-methylpentene-1 copolymer resin having a MI of 2.1 g/10 minutes and a density of 0.920 g/cm$^3$, 6 wt. % of LDPE resin having a MI of 2.4 g/10 minutes and a density of 0.923 g/cm$^3$, 4 wt. % of furnace carbon black (using 10 wt. % of LDPE resin masterbatch containing 40 wt. % of the carbon black) and 0.05 wt. % of erucic amide and 0.1 wt. % of synthetic silica as antiblocking agents. The aluminum metallized biaxially stretched polyester resin film 22 and the adhesive layer 2 were the same as Example V, except that the adhesive layer did not contain carbon black.

Conventional Example III

The packaging material of Conventional Example III corresponds to FIG. 20. The light-shielding coextruded double layer inflation film 24a consisted of the light-shielding HDPE resin film 25a 30 μm in thickness composed of 97 wt. % of HDPE resin having a MI of 0.4 g/10 minutes, a density of 0.964 g/cm$^3$ and a Young's modulus of 150 kg/mm$^2$ and 3 wt. % of furnace carbon black and the L-LDPE resin film 26a 20 μm in thickness composed of 89.85 wt. % of low pressure ethylene-4-methylpentene-1 copolymer resin having a MI of 2.1 g/10 minutes and a density of 0.920 g/cm$^3$, 6 wt. % of LDPE resin having a MI of 2.4 g/10 minutes and a density of 0.923 g/cm$^3$, 4 wt. % of furnace carbon black (using 10 wt. % of LDPE resin masterbatch containing 40 wt. % of the carbon black) and 0.05 wt. % of erucic amide and 0.1 wt. % of synthetic silica as antiblocking agents. The aluminum metallized biaxially stretched polyester resin film 22 and the adhesive layer 2 were the same as Example V, except that the additive layer did not contain carbon black.

Various properties of the packaging materials of Examples IV through VII and Conventional Examples I through III were measured, and summarized in Table 2.

TABLE 2

| Properties | Unit | Invention | | | | Conventional | | |
|---|---|---|---|---|---|---|---|---|
| | | IV | V | VI | VII | I | II | III |
| Curling | — | A | B | A | B | E | E | C |
| Tear Strength | g | A | A | A | A | E | B | E |
| Heat Seal Strength | g/15 mm width | A | A | A | A | D | C | B |
| Tensile Strength | kg/15 mm | A | B | A | B | B | B | A |
| Heat Sealing Properties | — | A | A | A | A | E-D | B | A |
| Light-Shielding Ability | — | A | A | A | A | E | E | D |
| Bag-Making Ability | — | A | A | B | A | D | C | A |

Evaluations in Table 2 were carried out as follows:
A   very excellent
B   excellent
C   practical
D   having a problem
E   impractical Testing methods were as follows:

Curling:

A square test piece of each packaging material having a width of 80 cm and a length of 1 m was hung down, and the curling state was measured.

Tear Strength: According to JIS P-8116

Heat Seal Strength:

Two sheets of each packaging material having a width of 15 mm were superposed so that the heat sealing sides were faced each other, and heat sealed at an optimum temperature where the heat seal strength became the maximum, at a sealing pressure of 1 kg/cm$^2$ for one second. The heat sealed packaging material was left in a room controlled at 20° C. at 65% RH for 24 hours, and the load necessary to separate the sealed portion at an angle of 180 degrees.

Tensile Strength: According to JIS P-8113

Heat Sealing Properties:

Judged by heat seal strength, hot tack properties, sealability with other materials, elapsed heat seal strength and heat sealable temperature tolerance, collectively.

Light-Shielding Ability:

A photographic film of ASA 100 was put into the three-sided fin seal bag made by each packaging material, and then the bag was completely sealed. This bag was exposed to the light of 80,000 luxes for one hour, and the light-shielding ability was estimated by the fogging degree of the developed photographic film.

Bag-Making Ability:

Estimated by workability for automatic bag-making, heat sealing properties, occurrence of pinholes etc. at the time of packaging a roll of color photographic printing paper in each gusset bag made of each packaging material.

Example VIII

The packaging material of Example VIII corresponds to the embodiment of FIG. 15. The intermediate high Young's modulus thermoplastic resin layer 15a was a light-shielding HDPE resin film 30 μm in thickness composed of 97 wt. % of HDPE resin having a MI (ASTM D-1238) of 0.4 g/10 minutes, a density (ASTM D-1505) of 0.964 g/cm$^3$ and a Young's modulus of 150 kg/mm$^2$ and 3 wt. % of furnace carbon black. The first and second light-shielding thermoplastic resin layers 14a, 16a were the thermoplastic resin films 20 μm in thickness composed of 89.85 wt. % of low pressure ethylene-4-methylpentene-1 copolymer resin having a MI of 2.1 g/10 minutes and a density of 0.920 g/cm$^3$, 6 wt. % of LDPE resin having a MI of 2.4 g/10 minutes and a density of 0.923 g/cm$^3$, 4 wt. % of furnace carbon black (using 10 wt. % of LDPE resin masterbatch containing 40 wt. % of the carbon black) and 0.05 wt. % of erucic amide and 0.1 wt. % of synthetic silica as antiblocking agents. The coextruded multilayer film IIIa constructed by the above three layers was molded by the inflation process. The aluminum metallized biaxially stretched polyester resin layer 17 was a biaxially stretched polyester resin layer 18 having a thickness of 12 μm provided with an aluminum membrane 19 having a thickness of 400 Å through an anchor coating layer. The adhesive layer 2 having a thickness of 15 μm was composed of LDPE resin having a MI of 5.1 g/10 minutes and a density of 0.919 g/cm$^3$, and was formed by extrusion laminating.

Example IX

The packaging material of Example IX corresponds to the embodiment of FIG. 15. The light-shielding thermoplastic resin layers 14a, 16a were the light-shielding L-LDPE resin layers 20 μm in thickness composed of 80 wt. % of ethylene-octene-1 copolymer resin having a MI of 4.0 g/10 minutes and a density of 0.925 g/cm$^3$, 10 wt. % of HDPE resin having a MI of 1.1 g/10 minutes and a density of 0.954 g/cm³, 6 wt. % of LDPE resin and 4 wt. % of furnace carbon black. The other layers were the same as Example VIII.

Example X

The packaging material of Example X corresponds to the embodiment of FIG. 15. The intermediate high Young's modulus thermoplastic resin layer 15a containing a light-shielding material was a light-shielding nylon 6 resin layer 30 μm in thickness composed of 60 wt. % of nylon 6 resin, 32.5 wt. % of adhesive resin (modified polyethylene resin "ADMER", Mitsui Petrochemical Industries), 4.5 wt. % of the same LDPE resin as Example VIII and 3 wt. % of furnace carbon black. The other layers were the same as Example IX.

Example XI

The packaging material of Example XI corresponds to the embodiment of FIG. 16. The intermediate high Young's modulus thermoplastic resin layer 15a was a light-shielding HDPE resin layer 20 μm in thickness having the same resin composition as Example VIII. The other intermediate high Young's modulus thermoplastic resin layer 15 not containing a light-shielding material was a nylon 6 resin film 10 μm in thickness composed of 60 wt. % of nylon 6 and 40 wt. % of an adhesive resin (modified polyethylene resin "ADMER", Mitsui Petrochemical Industries). The other layers were the same as Example IX.

Conventional Example IV

The packaging material of Conventional Example IV corresponds to FIG. 19. The polyethylene resin film 21a containing a light-shielding material was a light-shielding LDPE resin inflation film 70 μm in thickness composed of 97 wt. % of LDPE resin having a MI of 2.4 g/10 minutes and a density of 0.923 g/cm³ and 3 wt. % of furnace carbon black. The aluminum metallized biaxially stretched polyester resin film 22 and the adhesive layer 2 were the same as Example VIII.

Conventional Example V

The packaging material Conventional Example V corresponds to FIG. 19. The polyethylene resin film 21a containing a light-shielding material was the same as Conventional Example II. The aluminum metallized biaxially stretched polyester resin film 22 and the adhesive layer 2 were the same as Example VIII.

CONVENTIONAL EXAMPLE VI

The packaging material of Conventional Example VI corresponds to FIG. 20. The light-shielding coextruded double layer inflation film 24a was the same as conventional Example III. The aluminum metallized biaxially stretched polyester resin layer 22 and the adhesive layer 2 were the same as Example VIII.

Various properties of the packaging materials of Examples VIII through X and Conventional Examples of IV through VI were measured, and summarized in Table 3.

TABLE 3

| Properties | Unit | Invention | | | Conventional | | |
| --- | --- | --- | --- | --- | --- | --- | --- |
| | | VIII | IX | X | IV | V | VI |
| Film Moldability I | — | A | A | A | B | C | C |
| Film Moldability II | — | A | A | A | B | C | B |
| Curling I | — | A | A | A | A | A | C |
| Tear Strength of Film | g | B | A | A | E | A | E |
| Young's Modulus of Film | kg/mm² | B | A | A | E | E | B |
| Heat Seal Strength | g/15 mm width | B | A | A | D | C | B |
| Tensile Strength | kg/15 mm | B | A | A | D | D | B |
| Heat Sealing Properties | — | A | A | A | D-E | B | A |
| Light-Shielding Ability | — | B | A | A | E | E | D |
| Curling II | — | B | B | B | E | E | C |
| Bag-Making Ability | — | A | A | A | D | C | A |

Evaluations in Table 3 were the same as Table 2.
Testing methods were as follows:
Film Moldability I:
Judged by the degree of the white powder and agglomerates thereof adhered to the guide rollers and wound film and the degree of the occurrence of pressure marks by visual observation, when each film was molded using an inflation film molding machine with a die having a clearance of 1 mm at a blow-up ration of 1.5.
Film Moldability II:
Judged by motor load (electric current value), bubble stability, generation of melt fracture, fish eyes and lumps, collectively.
Curling I:
Each packaging material was cut into a circular test piece having a diameter of 10 cm, and allowed to stand under a flat plate weighing 1 kg in an atmosphere at 20° C. at 65% RH for 24 hours. Then, the test piece was allowed to stand under the same atmosphere under no load, and the curling state after 24 hours was evaluated.
Tear Strength:
According to JIS P-8116.
Young's Modulus:
According to ISO R1184-1970.
Heat Seal Strength:
The same as in Table 2.
Tensile Strength:
According to JIS P-8113.
Heat Sealing Properties:
The same as in Table 2.
Light-shielding Ability:
Each packaging material was scraped three times with an edge of color photographic printing paper, and evaluated in the same method as in Table 2.
Curling II:
A square test piece of each packaging material having a width of 1 m was hung down, and the curling state was evaluated.
Bag-Making Ability:
The same as in Table 2.

I claim:

1. A packaging material for photographic photosensitive materials which consists essentially of a thermoplastic resin film containing a light-shielding material, a high Young's modulus thermoplastic resin film having a Young's modulus of more than 60 kg/mm², a low Young's modulus thermoplastic resin film containing a light-shielding material and a high Young's modulus thermoplastic resin film having a Young's modulus of more than 60 kg/mm² superposed in this order wherein the low Young's modulus thermoplastic resin film has a Young's modulus less than that of the high Young's modulus films by more than 10%.

2. The packaging material of claim 1 wherein the four thermoplastic resin films are coextruded.

3. The packaging material of claim 1 wherein both of the high Young's modulus thermoplastic resin films are composed of a resin selected from the group consisting of polyamide resins, polyester resins, polypropylene resins, polyethylene resins having a density of more than 0.940 g/cm$^3$ and polystyrene resins, the low Young's modulus thermoplastic resin film is composed of a resin selected from homopolyethylene resins having a density of less than 0.940 g/cm$^3$, ethylene-α-olefin copolymer resins having a density of less than 0.940 g/cm$^3$, ethylene-acrylate ester copolymer resins, very low density polyethylene resins, ethylene-vinyl acetate copolymer resins, ethylene-acrylic acid copolymer resins, ionomer resins and adhesive polyolefin resins, and the thermoplastic resin film is composed of a resin selected from the group consisting of low, medium and high density homopolyethylene resins, very low density polyethylene resins, ethylene-α-olefin copolymer resins, homopolypropylene resins, propylene-α-olefin copolymer resins, ethylene-vinyl acetate copolymer resins, ethylene-ethyl acrylate copolymer resins, ethylene-acrylic acid copolymer resins, ionomer resins and adhesive polyolefin resins.

4. The packaging material of claim 1 wherein the Young's modulus of both high Young's modulus thermoplastic resin films is more than 100 kg/mm$^2$.

5. The packaging material of claim 1 wherein the Young's modulus of the low Young's modulus thermoplastic resin film is less than that of the lower one of the high Young's modulus thermoplastic resin films by more than 30%.

6. A packaging material for photographic photosensitive materials which comprises a coextruded multilayer film consisting essentially of a high Young's modulus thermoplastic resin layer having a Young's modulus of more than 60 kg/mm$^2$ and thermoplastic resin layers containing a light-shielding material disposed on both sides of the high Young's modulus thermoplastic resin layer, and a high Young's modulus flexible sheet having a Young's modulus of more than 60 kg/mm$^2$ laminated thereto.

7. The packaging material of claim 6 wherein the high Young's modulus thermoplastic resin layer is composed of a resin selected from the group consisting of polyamide resins, polyester resins, polypropylene resins, polyethylene resins having a density of more than 0.940 g/cm$^3$ and polystyrene resins, the thermoplastic resin layers are composed of a resin selected from the group consisting of low, medium and high density homopolyethylene resins, very low density polyethylene resins, ethylene-α-olefin copolymer resins, homopolypropylene resins, propylene-α-olefin copolymer resins, ethylene-vinyl acetate copolymer resins, ethylene-ethyl acrylate copolymer resins, ethylene-acrylic acid copolymer resins, ionomer resins and adhesive polyolefin resins, and the high Young's modulus flexible sheet has a Young's modulus of more than 60 kg/mm$^2$ and is a member selected from the group consisting of uniaxially or biaxially molecularly oriented films of polyamide resins, polyester resins, polyethylene resins polypropylene resins, polycarbonate resins, polystyrene resins and polyvinyl chloride resins, unstretched films of polyamide resins, polyester resins, high density polyethylene resins, polypropylene resins, papers, synthetic papers, aluminum metallized uniaxially or biaxially molecularly oriented thermoplastic resin films, metal foils, cellophane and triacetate films.

8. The packaging material of claim 6 wherein the Young's modulus of both high Young's modulus thermoplastic resin layers is more than 100 kg/mm$^2$.

9. The packaging material of claim 6 wherein the Young's modulus of the thermoplastic resin layer is less than that of the lower one of the high Young's modulus thermoplastic resin layer by more than 30%.

* * * * *